United States Patent [19]

Finch et al.

[11] Patent Number: 4,544,706

[45] Date of Patent: Oct. 1, 1985

[54] HIGHLY IMPACT RESISTANT CARBONATE POLYMER BLENDS

[75] Inventors: Charles R. Finch; Leslie E. Wallace; Thomas E. Evans, all of Midland, Mich.

[73] Assignee: The Dow Chemical Company, Midland, Mich.

[21] Appl. No.: 550,851

[22] Filed: Nov. 14, 1983

Related U.S. Application Data

[63] Continuation-in-part of Ser. No. 446,148, Dec. 2, 1982, abandoned.

[51] Int. Cl.[4] ............................................. C08L 69/00
[52] U.S. Cl. ................................... 525/146; 525/148; 525/468
[58] Field of Search ............... 525/146, 148, 67, 92, 525/468; 264/176 R

[56] References Cited

U.S. PATENT DOCUMENTS

| | | | |
|---|---|---|---|
| 3,239,582 | 3/1966 | Keskkula et al. | 260/873 |
| 3,801,673 | 4/1974 | O'Connell | 525/148 |
| 3,880,783 | 4/1975 | Serini et al. | 260/3 |
| 4,439,582 | 3/1984 | Henton | 525/148 |

FOREIGN PATENT DOCUMENTS

| | | | |
|---|---|---|---|
| 13384 | 6/1968 | Japan | 525/148 |
| 3034853 | 3/1978 | Japan | 525/148 |
| 57-34146 | 2/1982 | Japan . | |

*Primary Examiner*—Theodore E. Pertilla

[57] ABSTRACT

Carbonate polymer compositions comprise extruded blends of a carbonate polymer and a copolymer consisting essentially of a monovinylidene aromatic comonomer and an $\alpha,\beta$-ethylenically unsaturated comonomer having a polar group. Optionally, a small amount of monovinylidene copolymer can be blended with said composition. Such compositions exhibit high impact strengths, improve the melt processability of the carbonate polymer and are advantageously highly transparent and exhibit low haze.

20 Claims, No Drawings

HIGHLY IMPACT RESISTANT CARBONATE POLYMER BLENDS

RELATED APPLICATION

This application is a continuation-in-part of copending U.S. patent application No. 446,148, filed Dec. 2, 1982 now abandoned.

BACKGROUND OF THE INVENTION

This invention relates to blends of carbonate polymers with monovinyl aromatic polymers and, in particular, those blends which are highly impact resistant.

Carbonate polymers derived from reactions of dihydroxyorganic compounds, particularly the dihydric phenols, and carbonic acid derivatives such as phosgene have found extensive commercial application because of their excellent physical properties. These thermoplastic polymers appear suitable for the manufacture of molded parts wherein impact strength, rigidity, toughness, heat resistance, excellent electrical properties, glass-like transparency and good clarity are required.

Unfortunately, however, these polymers are expensive in price and require a high amount of energy expenditure in extrusion and molding processes. In order to reduce the cost of processing carbonate polymers, said polymers may contain other polymeric additives that reduce costs and lower the temperatures required for molding processes. Although such polymeric additives act to lower the melt viscosity of essentially pure polycarbonate, and thus reduce processing costs, such additives generally cause the mixture to become translucent and exhibit a lower impact resistance.

More recently, for example, as taught in U.S. Pat. No. 3,239,582, alkenylaromatic resins may be blended and injection molded with polycarbonate resins. While said resins, when blended in small amounts, do not have a substantial deleterious effect on the physical properties of the polycarbonate, they do introduce deleterious effects at high concentrations of additive relative to the polycarbonate. In order to significantly reduce the cost of the carbonate polymer blend, it is desirable to employ relatively large amounts of additives without adversely affecting many of the desirable physical and mechanical properties of the polycarbonate.

In view of the deficiencies of conventional carbonate polymer compositions, it would be highly desirable to provide an economical composition exhibiting improved processability and, optimally, having good transparency and clarity while maintaining good toughness even when relatively large amounts of polymeric additive are present in the blend.

SUMMARY OF THE INVENTION

The present invention is such a desirable composition. In one aspect, the present invention is an extruded sheet-like thermoplastic composition comprising a continuous phase comprising a carbonate polymer, and a discontinuous phase comprising a copolymer of a monovinylidene aromatic comonomer and an $\alpha, \beta$-ethylenically unsaturated comonomer having a pendant polar group; and wherein said copolymer is employed in amounts sufficient to improve the melt processability of the carbonate polymer; and wherein said discontinuous phase comprising a copolymer is in the form of laminar layers distributed within the continuous phase, which layers are essentially parallel to the surface of said sheet-like material; and wherein said copolymer is present in proportions such that said composition exhibits a Rheometrics Dart impact strength which nearly meets or exceeds that of the essentially pure carbonate polymer. The compositions of this invention exhibit Rheometrics Dart impart strengths that exceed that of similar compositions having similar amounts of components which are prepared using conventional compression molding or injection molding techniques.

As used herein, the term "essentially pure carbonate polymer" refers to a carbonate polymer composition containing no significant amount of polymeric additivies or impurities. By the term "improve the melt processability" is meant that significantly less power is required to extrude said carbonate polymer composition than is required to extrude essentially pure carbonate polymer. By the term "nearly meets" is meant that the impact strength of said carbonate polymer composition is within about 50 percent of that of essentially pure carbonate polymer.

In another aspect, the present invention is an extruded, transparent carbonate polymer composition as previously described.

In yet another aspect, the present invention is a method for preparing an extruded sheet-like thermoplastic composition, as previously described, wherein the carbonate polymer and the copolymer are introduced into an extruding device and extruded through a die region to yield said sheet-like thermoplastic composition.

The carbonate polymer blends of the present invention are suitably employed in most applications in which highly impact resistant carbonate polymers have been previously utilized. In addition, the carbonate polymer blends exhibit improved hydrolytic stability and good heat distortion as compared to that of essentially pure carbonate polymer. In particular, the transparent carbonate polymer blends do not exhibit high amounts of translucence and brittleness even when the additives are present in relatively large amounts relative to the carbonate polymer.

The carbonate polymer blends of this invention allow the skilled artisan to prepare compositions which comprise lesser amounts of carbonate polymer and larger amounts of copolymer additive, and are suitably employed in most applications in which carbonate polymers and blends of carbonate polymer with various rubber modified polymers have previously been utilized. Applications of particular interest for these carbonate polymer blends are glazing applications such as for windows and signs, profiles and moldings, housings for electrical appliances, radio and television cabinets, automotive equipment including ornaments and business machine housings, and the like. Other uses include security glazing applications, and applications as in the production of shields, transportation vehicles overglazing, solar energy units such as in greenhouses and skylight units, and the like.

DETAILED DESCRIPTION OF THE EMBODIMENTS

The thickness of the extruded sheet can vary. For purposes of this invention, the term "sheet" is used as defined in ASTM D883 (i.e., a form of plastic in which the thickness is very small in proportion to length and width and in which the plastic is present as a continuous phase throughout, with or without filler). The thickness of the extruded sheets of this invention can vary depending upon the application which is desired. The thickness of extruded sheets typically vary from about 10 mils (i.e., about 0.25 mm) to about 1 inch (i.e., about 2.5 cm), preferably from about 30 mils (i.e., about 0.6 mm) to about 0.5 inch (i.e., about 1.3 cm), and most preferably from about 40 mils (i.e., about 1 mm) to about 0.25 inch (i.e., about 0.7 cm).

The carbonate polymers employed in the present invention are advantageously aromatic carbonate polymers such as trityl diol carbonates described in U.S. Pat. Nos. 3,036,036; 3,036,037; 3,036,038 and 3,036,039; carbonate polymers of bis(ar-hydroxyphenyl)alkylidenes (often called bisphenol-A type diols) including their aromatically and aliphatically substituted derivatives such as disclosed in U.S. Pat. Nos. 2,998,835; 3,028,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event a carbonate copolymer or interpolymer rather than a homopolymer is desired. Also suitable for the practice of this invention are blends of any of the above carbonate polymers. Also included in the term "carbonate polymer" are the ester carbonate copolymers of the types described in U.S. Pat. Nos. 3,169,121; 4,330,662 and 4,105,633. Of the aforementioned carbonate polymers, the carbonate polymers of bisphenol-A are preferred. Methods for preparing carbonate polymers for use in the practice of this invention are well known, for example, several suitable methods are disclosed in the aforementioned patents which are hereby incorporated by reference in their entirety.

Carbonate polymers produced from the bisphenols generally have refractive indices in the range of about 1.56 to about 1.60 units. For example, a typical commercially available carbonate polymer prepared from bisphenol-A has a refractive index of 1.586.

The copolymers of this invention which are blended with the carbonate polymer are copolymers of monovinylidene aromatic monomers and $\alpha$, $\beta$-ethylenically unsaturated copolymers having pendant polar groups. Suitable monovinylidene aromatic comonomers include the transparent analogs and homologs of styrene including $\alpha$-methyl styrene and other $\alpha$-alkyl styrenes; and ring substituted styrenes wherein the ring substituents include lower alkyl radicals such as methyl, ethyl, propyl, isopropyl, butyl, sec-butyl, tert-butyl radicals and combinations thereof, and ar-halostyrenes and ar-halo-$\alpha$-alkylstyrenes (halo is chloro or bromo); with styrene being most preferred.

For the purposes of this invention, a polar monomer is a polymerizable ethylenically unsaturated compound having a group moment in the range from about 1.4 to about 4.4 Debye units as determined by Smyth, C.P., *Dielectric Behavior and Structure*, McGraw-Hill Book Company, Inc., New York (1955). Suitable polar comonomers include transparent $\alpha,\beta$-ethylenically unsaturated nitriles such as acrylonitrile, methacrylonitrile, ethacrylonitrile, $\alpha$-haloacrylonitrile (halo is chloro or bromo), $\alpha$-methylacrylonitrile, $\alpha$-methylmethacrylonitrile and the like. Other such polar comonomers include transparent $\alpha,\beta$-ethylenically unsaturated carboxylic acids and their anhydrides and alkyl, aminoalkyl and hydroxyalkyl esters. Examples of such comonomers include acrylic acid, methacrylic acid, ethacrylic acid, $\alpha$-haloacrylic acid, $\alpha$-methyl acrylic acid, $\alpha$-methyl methacrylic acid, itaconic acid, fumaric acid, aconitic acid, maleic anhydride, ethyl acrylate, butyl acrylate, methyl methacrylate, aminoethyl acrylate and the like. The preferred comonomers include acrylonitrile and acrylic acid.

Suitable copolymers prepared from the above comonomers include, for example, styrene/acrylonitrile, $\alpha$-methylstyrene/acrylonitrile, ar-methylstyrene/acrylonitrile, styrene/methacrylonitrile, $\alpha$-methylstyrene/ar-methacrylonitrile, styrene/acrylic acid, $\alpha$-methylstyrene acrylic acid, methylstyrene acrylic acid, styrene methacrylic acid, styrene methacrylate, styrene butylacrylate, $\alpha$-methylstyrene methacrylate, styrene methylmethacrylate and other such combinations, with styrene acrylonitrile and styrene acrylic acid being most preferred.

It is desirable to employ as high a molecular weight copolymer as possible in order that said copolymer have a high viscosity and thus will correspondingly approach the viscosity of the carbonate polymer. It is understood that increasing the molecular weight of the copolymer will lead to better dispersion of the copolymer with the carbonate polymer and ultimately increase the toughness and strength of the blend. The weight average molecular weights of the copolymers described herein range from about 100,000 to about 400,000 as determined by solution viscosity.

The copolymers of this invention are readily prepared by known methods of radical polymerization such as by bulk polymerization, suspension polymerization, solution polymerization, emulsion polymerization, ect. See, for example, U.S. Pat. Nos. 4,028,433 and 4,068,064 for methods of preparation. Although the copolymers may be prepared using such methods known in the art, the said copolymers are most preferably prepared using a single stage highly backmixed reactor. This technology is preferred due to the capability of attaining little or no variance of monomer concentration throughout the resulting copolymer molecule. This narrow composition variation is preferable in order to produce a copolymer with a refractive index which nearly matches that of the carbonate polymer and thus provides good clarity.

The copolymers of this invention consist essentially of amounts of the aforementioned comonomers copolymerized in amounts sufficient to provide good impact strength to the carbonate polymer with which it is blended. The copolymers of this invention consist essentially of about 1 to about 50 weight percent, preferably about 1 to about 30 weight percent, most preferably about 1 to about 20 weight percent of the $\alpha,\beta$-ethylenically unsaturated polar comonomer; and about 50 to about 99 weight percent, preferably about 70 to about 99 weight percent, most preferably about 80 to about 99 weight percent, of the monovinylidene aromatic monomer.

In order for the carbonate polymer composition of this invention to exhibit the good physical properties that are exhibited by essentially pure carbonate polymers, the copolymers which constitute a part of the blend must be compatible with said carbonate polymer. It has surprisingly been found that the monovinylidene aromatic/$\alpha,\beta$-ethylenically unsaturated copolymers when extrusion blended with the carbonate polymer yield blends which exhibit Rheometric Dart impact resistances which actually exceed the impact resistances of essentially pure carbonate polymer by about 1 to about 20 percent when said copolymers are blended in amounts in the range from about 1 to about 30 weight percent based on the weight of the carbonate polymer/copolymer composition.

An especially preferred carbonate polymer composition consists essentially of a blend of a copolymer consisting essentially of about 10 to about 25, most preferably about 15 to about 20, weight percent unsaturated polar comonomer and about 75 to about 90, most preferably about 80 to about 85, weight percent monovinylidene aromatic monomer, and a carbonate polymer. The most preferable composition exhibits a high impact resistance as discussed above and, in addition, exhibits good impact resistance (i.e., an impact resistance greater than about 50 percent that of essentially pure carbonate polymer) in compositions containing about 30 to about 50 weight percent copolymer, and from about 50 to about 70 weight percent carbonate polymer. Such good compatibility of carbonate polymer and the copolymers of said compositions is believed to be due to the fact that the solubility parameter of such a copolymer is most nearly equal to that of the carbonate polymer with which it is blended.

The solubility parameter of a compatible copolymer (i.e., one that disperses well with the carbonate polymer) may range from about 8.5 to about 10.5, preferably from about 9.0 to about 10.2. See, for example, Boyer et al., *Encyclopedia of Polymer Science and Technology*, Vol. 13, page 210, John Wiley and Sons, Inc., (1970). For example, a copolymer containing about 16 to about 18 weight percent acrylonitrile and about 84 to about 86 weight percent styrene exhibits a solubility parameter of about 10.1. This solubility parameter matches that of a commercially available polycarbonate prepared from the polymerization of bisphenol-A and, in fact, such a styrene/acrylonitrile copolymer/carbonate polymer composition exhibits a high impact strength in the range of about 1 to about 20 percent greater than that of the essentially pure carbonate polymer when the copolymer is blended with the carbonate polymer in amounts of about 1 to about 30 weight percent copolymer and about 70 to about 99 weight percent carbonate polymer.

Copolymers which are compatible with the carbonate polymers of this invention function to improve the melt flow rate (i.e., increase the melt flow rate) of the resulting blend under shear conditions which are characteristic in the fabrication of essentially pure carbonate polymer when blended in the amounts as previously described. This allows for an easier processability of the blend relative to the essentially pure carbonate polymer. The copolymer is considered compatible if it displaces the glass transition temperature (Tg) of the carbonate polymer. The Tg is advantageously measured using a mechanical spectrometer, e.g., as manufactured by Rheometrics, Inc.

Carbonate polymer compositions can also be prepared by blending a compatibilizing amount of a monovinylidene aromatic polymer with a monovinylidene aromatic/$\alpha,\beta$-ethylenically unsaturated copolymer, and blending the resulting polymer blend with the carbonate polymer. Such carbonate polymer compositions can vary and depend upon factors such as the composition of the compatible copolymer. Generally, such compositions comprise about 70 to about 99 weight percent carbonate polymer, about 1 to about 30 weight percent monovinylidene aromatic/$\alpha,\beta$-ethylenically unsaturated compatible copolymer, and from about 0 to about 12 weight percent monovinylidene aromatic polymer (e.g., styrene). Additionally, good impact resistance (i.e., an impact resistance of greater than about 20 percent that of essentially pure carbonate polymer) is observed in compositions consisting essentially of about 50 to about 99 percent carbonate polymer, about 1 to about 50 weight percent copolymer and from about 0 to about 12 weight percent monovinylidene aromatic polymer. The good impact strengths of such compositions are surprising because a carbonate polymer/monovinylidene aromatic polymer composition exhibits extremely poor impact resistance relative to that exhibited by essentially pure carbonate polymer. The good impact strength of the aforementioned compositions containing the monovinylidene aromatic polymer is believed to be due to the fact that the polymer is well-dispersed in the aforementioned compatible copolymer. The copolymer thus is a compatibilizer for the monovinylidene aromatic polymer additive in the carbonate polymer.

In the preparation of the blend of the present invention, the aforementioned polymeric components are combined by conventional mixing techniques such as admixing granular or particulate polymeric components and subsequent melt blending of the components. Alternatively, the blends may be prepared by heat plastifying the higher melting polymeric components (i.e., the carbonate polymer and the copolymer) and then adding other desired components thereto either in granular or heat plastified form. Generally, the order of mixing the blend components is not particularly critical.

The preferred method of forming the final product is through extrusion drawing or molding. Such surprisingly superior impact properties of the composition that are observed in the extruded sheets are believed to be due to the fact that the monovinylidene/$\alpha,\beta$-ethylenically unsaturated copolymer is well dispersed throughout the carbonate polymer. That is, the morphology of the composition is believed to be such that the additive is dispersed in the form of very thin platelets (i.e., laminar layers) rather than concentrated spheres or droplets. Such platelets are formed under high shear in the die region of the extruder, and are believed to have thicknesses of about 0.1 mil or less. That is, the discontinuous phase is in the form of laminar layers which are relatively thin with respect to their length and width. Conversely, compression molding yields spheres or droplets of copolymer which are typically about 1 mil or larger in thickness. Compression molding decreases the impact properties of the carbonate polymer because the copolymer additive can be present within the carbonate polymer as concentrated spheres, and is believed to act as large stress concentrators within the sheet.

The laminar flow necessary for the formation of the laminar structure is obtained by the passage of the melted (i.e. extruded) material through one or several dies. A significant consideration is the length in the direction of flow, of the constant cross-sectional orifice segment of the die, also known as the "die land", on which the creation of laminar layers depends. The optimal length is a function of the rheological properties of the material being treated, the nature of the surface of the die, the flow rate of the material as well as other parameters which will be readily apparent and which are necessary to achieve the desired flow scheme. Most desirably the material is sheet-like in nature which is extruded from a die defining an extrusion channel having mutually opposed parallel surfaces wherein the ratio of length of said channel in the direction of the flow of the material being extruded to the distance between the opposed surface which determines the thickness of the sheet-like material is fairly large, preferably greater than about 10.

One particularly convenient method for preparing the transparent blends of this invention is to dry blend a particulate of the carbonate polymer with a particulate of the aforementioned compatible copolymer and, optionally, the polymer additive such as polystyrene. This dry blend is directly fed into a heat fabricating apparatus such as a screw extruder or a reciprocating screw injection molding machine with sufficient mixing. While the particular manner of mixing these components in heat plastified form is not critical, sufficient mixing should be employed to ensure a uniform distribution of each of the components throughout the resulted blend. In addition to the foregoing mixing procedures, other conventional mixing procedures may be employed including hot roll milling, kneading and the like. It should be understood that such blends, though transparent due to the closely matched refractive indices of the copolymer and carbonate polymer, do not necessarily exhibit the good impact resistances in accordance with the present invention unless the composition is extrusion molded as previously described, or injection molding conditions are such as to yield the formation of the previously described thin platelets (i.e., laminar layers). In fact, it is expected that the carbonate polymer compositions as described herein exhibit impact strengths comparable to that of essentially pure carbonate polymer when properly injection molded (i.e., such as to form thin platelets). It is further understood that such compositions can be included within the scope of this invention.

It is desirable to employ various types of extrusion devices. Such devices can include the single screw, double screw, or multiple screw extruders having a planetary screw and/or a plate for transformation of the mixtures into finished or semifinished products. However, as previously mentioned, any other machine capable of bringing polymeric components into the melted state and providing a continuous or intermittent flow of the composition through the die can be employed. The composition can be generally employed after it has left the die region without further injection or compression molding, etc.

A condition for transparency of carbonate polymer blends such as those as are the subject of this invention is a substantial equality of the refractive indices of the polymer constituents. In order to obtain highly transparent blends, the copolymer additives most advantageously have a refractice index which differs by not more than about 0.002 unit from that of carbonate polymer. A compound is defined as transparent for the purposes of this invention if a layer 50 mils in thickness exhibits a luminous transmittance (according to ASTM D-1003-61) of at least about 70 percent. A transmittance of greater than 80 percent is preferred. For glazing purposes, a transmittance of above about 85 is most preferred. In addition to high transmittance, it is also desirable for the blend to exhibit a low haze (i.e., exhibit high clarity). For glass-like clarity, a haze of about 5 percent or less (according to ASTM D-1003-61) is most desirable. For most glazing purposes, a haze of less than about 15 percent is preferred. As used herein, "transparent carbonate polymer compositions" means such a composition that exhibits a high luminous transmittance as well as a low haze.

The copolymers that are employed in preparing the transparent blends of this invention are prepared by copolymerizing the monovinylidene aromatic comonomer with the $\alpha,\beta$-ethylenically unsaturated polar comonomer in such proportions as to yield a copolymer which is transparent and exhibits a refractive index which very nearly matches that of carbonate polymer. The copolymers of the present invention most advantageously consist essentially of about 80 to about 99 weight percent of monovinylidene aromatic comonomer and from about 1 to about 20 percent of $\alpha,\beta$-ethylenically unsaturated comonomer. Such copolymer compositions exhibit refractive indices in the range from about 1.589 to about 1.575.

Optionally, a small amount of monovinylidene aromatic polymer can be blended with the carbonate compositions in small amounts in order to effectively increase the refractive index of the copolymer additive and consequently improve the transparency and clarity of the blend. This is particularly necessary when the carbonate polymer is not dried particularly well prior to blending, and the observed refractive index of said carbonate polymer appears slightly higher than that of the copolymer which has a refractive index which is theoretically equal to well-dried (i.e., essentially pure) carbonate polymer. For example, crystalline polystyrene has a refractice index of about 1.590 units. Thus, the addition of a small amount of polystyrene will effectively increase the refractive index exhibited by the copolymer additive in such a way as to more closely match that of the carbonate polymer. It is preferable to keep the addition of the polystyrene to less than about 12 weight percent, most preferably less than about 10 weight percent, relative to the total weight of the carbonate composition. The addition of the polystyrene is kept to a minimum amount because higher amounts can introduce haze to the carbonate polymer compositions and, more importantly, the addition of polystyrene in amounts higher than about 12 weight percent tends to introduce brittleness and a corresponding lower impact strength to the carbonate polymer composition. It is further understood that copolymers of this invention having increased $\alpha,\beta$-ethylenically unsaturated polar comonomer concentrations will become less compatible with an additive such as polystyrene because of the increasing difference in the compositions of the two polymeric species.

In accordance with this aspect of the invention, in addition to the transparency of copolymer, the copolymer must be compatible with the carbonate polymer. That is, the carbonate polymer composition must exhibit the good physical properties which are exhibited by essentially pure carbonate polymer. It has surprisingly been found that the monovinylidene aromatic-/$\alpha,\beta$-ethylenically unsaturated polar copolymers when extrusion blended with the carbonate polymer yield transparent blends which exhibit high Rheometrics Dart impact resistances.

Especially preferred copolymers employed in preparing transparent blends include those prepared from the polymerization of styrene and acrylonitrile such that said styrene/acrylonitrile (SAN) copolymer contains an amount of acrylonitrile (AN) such that said copolymer has a refractive index which very nearly matches that of the carbonate polymer, preferably within about 0.002 unit of that of carbonate polymer. For example, a preferred SAN copolymer of this aspect of the present invention comprises about 92 to about 95 weight percent styrene, preferably about 94.4 percent styrene, and about 5 to about 8 percent acrylonitrile, preferably about 5.4 to about 5.8 percent acrylonitrile, most preferably 5.6. The SAN containing about 5 to about 8 weight percent content of AN has a refractive index of about 1.584 to about 1.586. This preferred additive exhibits a refractive index which very nearly equals that of commercially available carbonate polymer, which exhibits a refractive index of about 1.586.

Preferred transparent carbonate polymer/SAN blends contain from about 75 to about 99 weight percent of carbonate polymer. Such blends maintain Rheometric Dart impact strengths of at least 50 percent that of essentially pure polycarbonate. The carbonate polymer/SAN blends exhibit improved flow properties, as might be expected, but they also exhibit impact resistances which are unusually high in view of the impact resistances of the blend components. Most surprisingly, the most preferred embodiments (i.e., blends containing greater than about 80 weight percent carbonate polymer) exhibit impact resistances which actually exceed the impact resistance of the carbonate polymer component.

Other preferred copolymers employed in preparing transparent blends include those prepared from the polymerization of styrene and acrylic acid such that said styrene/acrylic acid (SAA) copolymer contains an amount of acrylic acid (AA) such that said copolymer has a refractive index which very nearly matches that of the carbonate polymer, preferably within about 0.002 unit of that of carbonate polymer. For example, a SAA of the present invention comprises about 1 to about 8 weight percent of AA, preferably about 7 to about 8 weight percent AA; and about 92 to about 99 weight percent styrene. Such a copolymer has a refractive index which nearly equals that of a commercially available carbonate polymer.

Carbonate polymer/SAA blends maintain good impact resistant properties (i.e., greater than about 50 percent of that of essentially pure carbonate polymer) in the range from about 84 to about 99 weight percent of carbonate polymer. The polycarbonate-SAA blends exhibit improved flow properties, as might be expected, but they also exhibit impact resistances which are unusually high in view of the impact resistances of the blend components. Most surprisingly, the most preferred embodiments (i.e., blends containing greater than about 88 weight percent polycarbonate) exhibit impact resistances which actually exceed the impact resistance of the carbonate polymer component.

In addition to the aforementioned polymeric components, it is sometimes desirable to incorporate other additives into the blend. In this regard, such additives as stabilizers, lubricants, plasticizers, antioxidants, fire retardants, fillers, reinforcing fibers such as glass fibers, pigments, and the like can be employed in the blends of this invention in a manner similar to the employment of such additives in conventional carbonate polymer blends.

The following examples are given to further illustrate the invention and should not be considered as limiting the scope thereof. All percentages are in weight percent unless otherwise noted.

EXAMPLE 1

The SAN copolymer is prepared as follows. The feed of a single stage highly backmixed polymerization apparatus is continuously maintained with 8 percent ethylbenzene, 88 percent styrene and 4 percent acrylonitrile. The reaction is chemically initiated using an azo initiator. The feed coil is continuously maintained at 143° C., and reactants continuously circulated to achieve a one hour residence time of the ingredients. The resulting composition is 49 percent solids. The partial polymer is passed from the reactor to devolatilization equipment where the unreacted monomers and diluent are stripped from the product. The resulting SAN copolymer consists of 94.5 percent styrene and 5.5 percent acrylonitrile. The viscosity as determined using a Cannon-Fennske Viscometer in a 10 percent solution of methyl ethyl ketone at 25° C. is 8.6 cps. The refractive index of such a composition is 1.585. The product is then molded into pellets or granules of desired size for further use.

In a like manner, SAN copolymers consisting of 5.3 percent AN (refractive index is 1.585) and 6.3 AN (refractive index is 1.584) are prepared and molded into pellet form for further use.

The SAN copolymer pellets (20 mils ×1/16 inch long) are tumbleblended in the desired amount with a sample of homocarbonate polymer of bisphenol-A, having a weight average molecular weight of between about 20,000 and about 40,000 and sold under the trade name, Merlon M50F-1000 by Mobay Chemical in pellet form of about 80 mils by ⅛ inch. A pellet blend of the SAN and the carbonate polymer (and, optionally, the polystyrene) are fed into the extruding device in the amounts illustrated in Table I. Pre-melt blending or compounding of the polymers prior to extrusion is not conducted in this example. A well-mixed pellet blend carbonate polymer and SAN (and, optionally, the polystyrene) is melted and mixed in a 1 ½inch single screw laboratory extruder. Typical extruder conditions are barrel temperatures: rear—550° F., center—575° F. and front—600° F. This results in an alloyed-type product with a melt temperature of about 600° F. This sheet is put through a 12 inch die to make a sheet having a thickness of about 50 mils. During the extrusion process, the extruder motor amperage requirement for the 90 percent polycarbonate blend is about one third of that required for 100 percent polycarbonate extrusion at the same lbs/hr output, indicating improved processability. This sheet is impact tested using a dart or plunger type impact tester (i.e., the Rheometrics testing device). Impact and light transmission data concerning such blends are presented in Table I.

TABLE I

| Sample | Description | Impact[1] | Luminous Transmittance[2], % | Haze[2], % |
|---|---|---|---|---|
| A* | PC reference[3] | 222 | 86.7 | 5.0 |
| 1 | 90% PC 10% SAN[4] | 259 | 91.0 | 4.9 |
| 2 | 92.5% PC 7.5% SAN[5] | 252 | 88.6 | 7.6 |
| 3 | 85% PC 15% SAN[4] | 213 | 87.9 | 14.3 |
| 4 | 92.5% PC 5% SAN[5] 2.5% PS[7] | 241 | 88.8 | 5.8 |
| 5 | 85% PC 10% SAN[4] 5% PS[7] | 222 | 88.5 | 8.1 |
| 6 | 90% PC 6.7% SAN[4] 3.3% PS[7] | 261 | 88.5 | 5.1 |
| 7 | 85% PC 10% SAN[6] 5% PS[7] | 209 | 88.5 | 6.5 |
| B* | 90.6% PC | 138 | 89.0 | 12.4 |

TABLE I-continued

| Sample | Description | Impact[1] | Luminous Transmittance[2], % | Haze[2], % |
|---|---|---|---|---|
| | 9.4% PS[7] | | | |

*Samples A and B are not examples of the invention and are included for reference and comparison purposes.*
[1] Inch-pounds measured by instrumented impact tester on an extruded sheet of about 50 mils, and is normalized to reflect impact on a 50 mil extruded sheet.
[2] Light transmission and haze measured in accordance with ASTM D-1003-61 on a 50 mil extruded sheet.
[3] PC reference is 100 percent carbonate polymer.
[4] SAN is about 5.5 percent AN and 94.5 percent styrene.
[5] SAN is about 5.3 percent AN and 94.7 percent styrene.
[6] SAN is about 5.9 percent AN and 94.1 percent styrene.
[7] PS is crystalline polystyrene and is sold commercially as Polystyrene 685D by The Dow Chemical Company.

The data in Table I indicates that the SAN containing 5.3 percent AN (Sample 2) allows good light transmission and continues to allow good clarity upon a carbonate polymer with which it is blended. Further, it is also observed that the addition of a small amount of polystyrene to such a blend increases the light transmission and clarity of the blend without decreasing the impact resistance of the blend relative to carbonate polymer (Sample Nos. 4–7). It is also observed that the addition of up to 15 percent SAN to the carbonate polymer (Sample No. 3) does not significantly affect the impact resistance of the blend relative to carbonate polymer.

EXAMPLE 2

The SAA copolymer is prepared using techniques similar to those described in Example 1 for the preparation of SAN copolymers, and blended with a carbonate polymer as described therein. In addition, small amounts of polystyrene are blended with the polycarbonate and the copolymer. Impact and light transmission data concerning such blends are presented in Table II.

TABLE II

| Sample | Description | Impact[1] | Luminous Transmittance[2], % | Haze[2], % |
|---|---|---|---|---|
| A* | PC reference[3] | 220 | 90.4 | 2.2 |
| 1 | 90% PC 10% SAA[4] | 207 | 90.3 | 3.3 |
| 2 | 86.5% PC 13.5% SAA[6] | 181 | 87.5 | 9.5 |
| 3 | 90% PC 10% SAA[7] | 250 | 89.2 | 4.3 |
| 4 | 90% PC 5% SAA[4] 5% PS[5] | 210 | 89.6 | 4.5 |
| 5 | 86.5% PC 4.5% SAA[8] 9.0% PS[5] | 190 | 87.9 | 7.0 |
| B* | 86.5% PC 13.5% PS[5] | 44 | 83.5 | 26.2 |

*Samples A and B are not examples of the invention and are included for reference and comparison purposes.
[1] Inch-pounds measured by instrumented tester on an extruded sheet of about 50 mils, and results are normalized to reflect impact on a 50 mil extruded sheet.
[2] Light transmission and haze measured in accordance with ASTM D-1003-61 on a 50 mil extruded sheet.
[3] PC reference is 100 percent carbonate polymer.
[4] SAA is about 3 percent AA and about 97 percent styrene.
[5] Polystyrene is crystalline polystyrene and is sold commercially as Polystyrene 685D by The Dow Chemical Company.
[6] SAA is about 2 percent AA and 98 percent styrene.
[7] SAA is about 4 percent AA and about 96 percent styrene.
[8] SAA is about 8 percent AA and 92 percent styrene.

The data in Table II indicates that SAA containing 2 percent AA imparts very good impact resistant properties upon a blend when present in an amount of 13.5 percent (Sample 2). Conversely, a blend of 13.5 percent polystyrene in carbonate polymer exhibits very poor impact properties (Sample B). The blends containing SAA (2 percent AA) and polystyrene also maintain good impact resistance as well as good transparency and clarity (Sample 5). The transparency and clarity of the SAA (8 percent AA)/carbonate polymer blend is affected to a limited extent, however, the impact resistance is extremely well maintained.

EXAMPLE 3

The hydrolytic stability of various samples is compared to that of polycarbonate. Samples are prepared as previously described. A stress is applied to each sample as each sample is immersed in a water bath at 80° C. Time to break each of the samples at the essentially constant stress are measured and the results are presented in Table III.

TABLE III

| Sample | Description | Applied Stress (psi) | Time to Break (min) |
|---|---|---|---|
| A* | PC reference[1] | 1,000 | 2,983 |
| 1 | 90% PC 10% SAN[2] | 1,000 | 10,402 |
| 2 | 92.5% PC 7.5% SAN[3] | 1,000 | 12,913 |
| 3 | 85% PC 10% SAN[4] 5% PS[5] | 1,000 | 25,449 |

*Not an example of the invention
[1] PC reference is as described hereinbefore
[2] SAN is about 15.8 percent AN and about 84.2 percent styrene, having a melt flow rate of 1.7
[3] SAN is about 5.3 percent AN and about 94.7 percent styrene, having a melt flow rate of 3.5
[4] SAN is about 5.9 percent AN and about 94.1 percent styrene, having a melt flow rate of 22.
[5] PS is polystyrene as defined hereinbefore The data in Table III indicates the good hydrolytic stability of samples of this invention.

What is claimed is:

1. An extruded sheet-like thermoplastic composition comprising a continuous phase comprising a carbonate polymer, and a discontinuous phase comprising a copolymer of a monovinylidene aromatic comonomer and an $\alpha,\beta$-ethylenically unsaturated comomoner having a pendant polar group and monovinylidene aromatic homopolymer; and wherein said copolymer is employed in amounts sufficient to improve the melt processability of the carbonate polymer; and wherein said discontinuous phase comprising a copolymer is in the form of laminar layers distributed within the continuous phase, which layers are essentially parallel to the surface of said sheet-like material; and wherein said copolymer is present in the composition in proportions such that said composition exhibits a Rheometrics Dart impact strength which nearly meets or exceeds that of the essentially pure carbonate polymer.

2. An extruded composition of claim 1 which is transparent.

3. A composition of claim 1 wherein said carbonate polymer is a polycarbonate of bisphenol-A.

4. A composition of claim 2 wherein said carbonate polymer is a polycarbonate of bisphenol-A.

5. A composition of claim 1 wherein said copolymer consists essentially of about 1 to about 30 weight percent $\alpha,\beta$-ethylenically unsaturated comonomer and about 70 to about 99 weight percent monovinylidene aromatic comonomer.

6. A composition of claim 2 wherein said copolymer consists essentially of about 1 to about 8 weight percent α,β-ethylenically unsaturated comonomer and about 92 to about 99 weight percent monovinylidene aromatic comonomer.

7. A composition of claim 1 wherein said copolymer is styrene/acrylonitrile.

8. A composition of claim 7 wherein said copolymer consists essentially of about 15 to about 20 weight percent acrylonitrile, and from about 80 to 85 weight percent styrene.

9. A composition of claim 2 wherein said copolymer is styrene/acrylonitrile.

10. A composition of claim 9 wherein said copolymer consists essentially of about 5 to about 7 weight percent acrylonitrile and about 93 to about 95 weight percent styrene.

11. A composition of claim 1 wherein said copolymer is styrene/acrylic acid.

12. A composition of claim 2 wherein said copolymer is styrene/acrylic acid.

13. A composition of claim 12 wherein said copolymer consists essentially of about 1 to about 8 weight percent acrylic acid and about 92 to about 99 weight percent styrene.

14. A composition of claim 1 such that said composition exhibits a Rheometrics Dart impact strength which exceeds that of the essentially pure carbonate polymer.

15. A composition of claim 2 such that said composition exhibits a Rheometrics Dart impact strength which exceeds that of the essentially pure carbonate polymer.

16. A composition of claim 1 wherein said monovinylidene aromatic homopolymer is polystyrene.

17. A composition of claim 1 wherein said copolymer consists essentially of from about 1 to about 15 weight percent of said α,β-ethylenically unsaturated comonomer and from about 85 to about 99 weight percent of said monovinylidene aromatic comonomer.

18. A composition of claim 1 wherein said copolymer consists essentially of from about 10 to about 25 weight percent of said α,β-ethylenically unsaturated comonomer and from about 75 to about 90 weight percent of said monovinylidene aromatic comonomer.

19. A composition of claim 1 wherein said copolymer and said monovinylidene aromatic homopolymer are present in proportions in the composition such that said composition exhibits a Rheometrics Dart impact strength which exceeds that of the essentially pure carbonate polymer.

20. A composition of claim 2 wherein said copolymer and said monovinylidene aromatic polymer are present in proportions in the composition such that said composition exhibits a Rheometrics Dart impact strength which exceeds that of the essentially pure carbonate polymer.

* * * * *